United States Patent [19]
Duranton

[11] Patent Number: 5,872,988
[45] Date of Patent: Feb. 16, 1999

[54] PARALLEL DATA PROCESSING DEVICE HAVING A CONCATENATED DATA PATH BETWEEN ELEMENTARY PROCESSORS

[75] Inventor: Marc Duranton, Boissy St. Leger, France

[73] Assignee: U.S. Philips Corporation, N.Y.

[21] Appl. No.: 823,003

[22] Filed: Mar. 21, 1997

Related U.S. Application Data

[63] Continuation of Ser. No. 421,142, Apr. 13, 1995, abandoned, which is a continuation of Ser. No. 72,801, Jun. 7, 1993, abandoned.

[30] Foreign Application Priority Data

Jun. 17, 1992 [FR] France ................................. 9207349

[51] Int. Cl.$^6$ ............................................. G06F 15/80
[52] U.S. Cl. ........................................... 395/800.22
[58] Field of Search .................. 395/800.01, 800.03, 395/800.07, 800.1, 800.22, 800.32, 200.43, 260.68, 670, 280, 821, 840, 841, 855, 376, 561; 364/131, 134

[56] References Cited

U.S. PATENT DOCUMENTS

| | | | |
|---|---|---|---|
| 4,466,064 | 8/1984 | Martin ..................................... | 395/800 |
| 4,994,982 | 2/1991 | Duranton et al. ......................... | 395/27 |
| 5,075,889 | 12/1991 | Jousselin et al. ......................... | 365/73 |
| 5,175,858 | 12/1992 | Hammerstrom ......................... | 395/800 |
| 5,218,709 | 6/1993 | Fijany et al. ............................. | 395/800 |
| 5,247,691 | 9/1993 | Sakai ....................................... | 395/800 |
| 5,293,459 | 3/1994 | Duranton et al. ......................... | 395/27 |
| 5,355,508 | 10/1994 | Kan ......................................... | 395/800 |
| 5,361,367 | 11/1994 | Fuany et al. ............................. | 395/800 |
| 5,410,727 | 4/1995 | Jaffe et al. ............................... | 395/800 |

FOREIGN PATENT DOCUMENTS

0322966  12/1987  European Pat. Off. .

*Primary Examiner*—Alpesh W. Shah
*Attorney, Agent, or Firm*—Anne E. Barschall; Ernestine C. Bartlett

[57] ABSTRACT

A data processing device, including a plurality (VP) of elementary processors (EP) which operate in parallel in a so-called common instruction mode acting on multiple data, and means (VSU) for collectively processing data (OB1-OBn) supplied by said elementary processors. The device includes a concatenated data path (DP) enabling an arbitrary elementary processor to communicate with at least one adjoining elementary processor. Input and output controllers (13,19) enable communication with a common input bus (ID). The processing utilizes vector-scalar transformation units (VSU), scalar-vector units (SVCU) and scalar-scalar units (SSU). Each device comprises an interface for connection to either other, identical devices or to external members (memory, controller, data look-up table . . . ).

18 Claims, 5 Drawing Sheets

PARALLEL DATA PROCESSING DEVICE HAVING A CONCATENATED DATA PATH BETWEEN ELEMENTARY PROCESSORS

This application is a continuation of application Ser. No. 08/421,142 filed Apr.13,1995, now abandoned, which is a continuation of application Ser. No. 08/072,801 filed Jun. 7, 1993, now abandoned.

FIELD OF THE INVENTION

The invention relates to a data processing device, comprising a plurality of elementary processors which operate in parallel in a so-called common instruction mode acting on multiple data using a plurality of output data buses, means for collectively processing multiple output data, a common input control bus and a common input data bus.

BACKGROUND OF THE INVENTION

In a device having such an architecture several processors operate simultaneously on different data by means of a single command and several results are output (this mode is referred to as the Singe Instruction/Multiple Data or SIMD mode). Extensively parallel architectures of this kind are used notably in neural networks. EP 0 322 966 describes a neural network whose architecture can be broken down into several elementary processors, each of which comprises a memory section for synaptic coefficients $C_{ij}$, a register for neuron states $V_i$, and means for calculating contributions $C_{ij}.V_i$. All these elementary processors share a common input bus and output in parallel a plurality of contributions $C_{ij}. V_i$ which are added in an adder tree.

Devices of this kind are conceived to ensure that the data follows a direct path (stream) between the input and the output. This type of architecture is provided so as to increase the execution speed of such data processing devices. Therefore, they are conceived to control at a maximum speed the data streams following parallel paths from the input to the output of said device. While following said parallel paths, the data streams remain independent until the instant at which they are collected so as to be collectively added, compared or otherwise.

Neural networks notably implement operations which become more and more sophisticated as applications become more and more diversified, utilizing more and more complex algorithms. For these diversified applications, a neural network having a given hardware structure must have available a wide range of instructions, enabling the network to implement a maximum number of applications and hence algorithms dedicated to each of these applications. Notably data streams following exclusively parallel paths do not allow for the processing of interactions between these streams in the course of their thus far independent processing.

In a neural network, these streams may be regrouped at the end of processing, but may not be combined before such final regrouping. Such a neural network thus lacks flexibility for adaptation to diversified tasks.

SUMMARY OF THE INVENTION

Therefore, it is an object of the invention to eliminate said exclusive independence of the parallel paths, and hence of the processing operations, by enabling the introduction of variable interactions between streams.

This object is achieved by means of a data processing device in which the elementary processors are provided with means enabling an arbitrary elementary processor to communicate with at least one adjoining elementary processor via at least one concatenated data path.

Thus, by communication with their two nearest neighbours, all processors can realize, for example two-by-two data permutations and also rotations in one or the other direction of all data. The latter mechanism necessitates connection of the first elementary processor to the last elementary processor. It is also possible to extract the data from the last elementary processor without connecting it to the first elementary processor.

These interactions between streams take place within the framework of the internal processing in each processor. However, the results are still delivered in parallel by each elementary processor via the plurality of output buses. These results together form a vectorial type of result. It can be transformed into a scalar type of result in a unit VSU for vector-to-scalar transformation.

In a specific embodiment, each elementary processor comprises input and/or output means and an identification member which activates said means when an identification signal is received by said processor, said device also comprising a scalar vector control unit (SVCU) which, in response to said identification signal, authorizes said elementary processor either to receive or to supply a scalar data. Several elementary processors can be authorized to receive at least one common scalar data.

The data processing device may be provided with a scalar-scalar transformation unit SSU which receives a scalar result from the vector-scalar transformation unit VSU. The scalar-scalar transformation unit SSU can supply said common scalar data.

Each elementary processor comprises a local memory for storing synaptic coefficients and/or neuron states. Preferably, the memory is organized as a stack of registers which stores synaptic coefficients and neuron states by storing either mainly synaptic coefficients or mainly neuron states. Preferably, the memory read-out mode is a double-access mode in order to access the synaptic coefficients as well as the neuron states, thus increasing the speed of execution.

The synaptic coefficients can be stored in the memory in a diagonal arrangement. Thus, as a result of the means enabling an elementary processor to communicate with an adjoining processor, it will be possible to transpose a matrix of synaptic coefficients $C_{ij}$ into a transposed matrix of synaptic coefficients $C_{ji}$. This possibility is used notably for executing the error back propagation algorithm in the course of learning phases implemented in a neural network.

These and other aspects of the invention will become apparent from and be elucidated with reference to embodiments described hereinafter.

BRIEF DESCRIPTION OF THE DRAWINGS

The invention will be better understood on the basis of the following Figures, given by way of non-limitative examples, in which.

DESCRIPTION OF EMBODIMENTS

Figure 1:
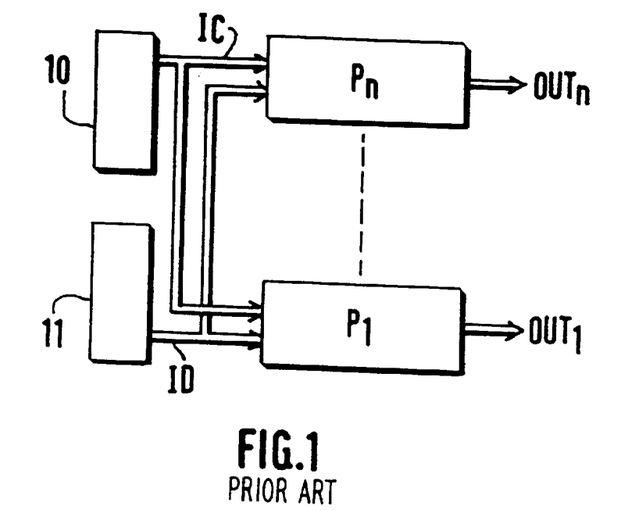
FIG. 1 shows a general diagram of a known architecture of a machine having an SIMD architecture.

FIG. 1 shows a simplified known architecture of a machine having an SIMD architecture. A plurality of elementary processors P1 . . . Pn, each of which is provided with a local memory, at a given instant receive in parallel the same instruction from a control unit 10. This common instruction is distributed to all processors via a common control bus IC. All processors thus perform the same task at the same time. However, this same task may be applied to data which is generally different. The data received by the elementary processors P1 . . . Pn is supplied by a common resource block 11. This data is distributed sequentially, or not, via a data bus ID. Thus, all processors can at the same time add a data on the bus ID to each of the results stored in each processor. It may also concern a series of data on the bus ID, each data having a rank number which is individually recognized by each processor. Thus, each elementary processor takes its respective data from said series of data and performs the programmed common operation.

The plurality of elementary processors thus supply a respective, individual result at their outputs OUT1 . . . OUTn. For example, a mechanism of this kind is implemented for image processing where each elementary processor takes charge of the individual processing of a pixel of the image. The outputs OUT1-OUTn thus supply a series of results which are independent of one another.

Figure 2:
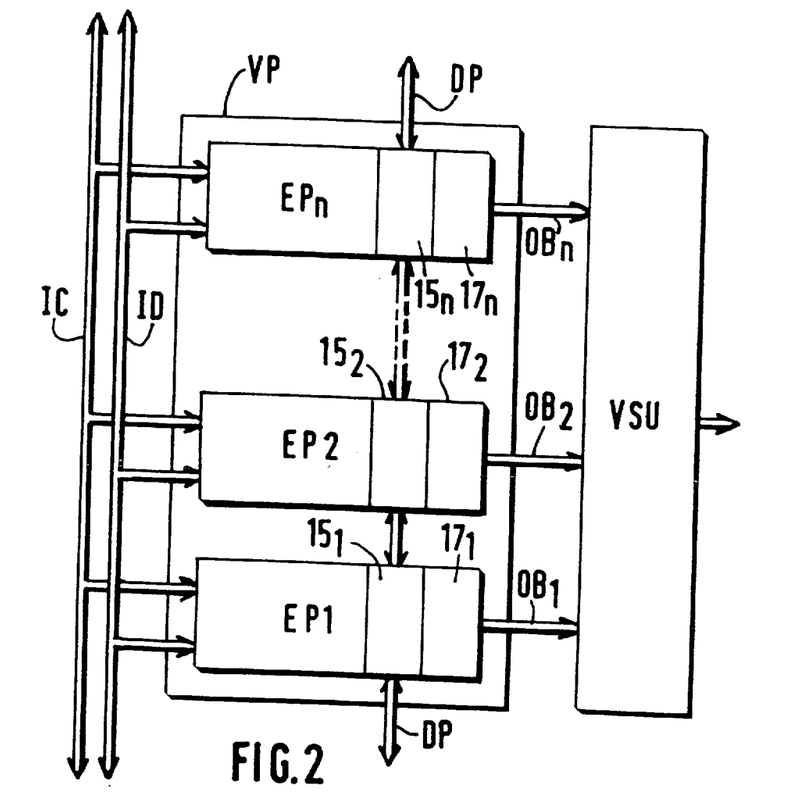
FIG. 2 shows a diagram of a first embodiment of a part of a data processing device in accordance with the invention.

FIG. 2 shows the architecture of a part of a data processing device in accordance with the invention, said architecture emphasizing interactions between the data streams implemented in and/or by elementary processors operating in the SIMD mode. The plurality of elementary processors EP1–EPn receive at their input instructions from a control bus IC and data from a data bus ID. Each elementary processor delivers a result to an individual output bus OB1–OBn, via output means $17_1$–$17_n$. In order to ensure that each elementary processor can communicate with its nearest neighbours, each elementary processor comprises communication means $15_1$–$15_n$ enabling the transfer of data via a concatenated path DP. It is thus possible to transfer data gradually to the other elementary processors. These data exchanges may concern any data present in the elementary processor. The data streams existing in each elementary processor, therefore, are no longer independent. This is particularly useful when the contribution made by an elementary processor is associated with the contributions made by the other processors. This is the case, for example when the plurality of elementary processors EP1–EPn constitutes a vectorial processor VP delivering a plurality of results constituting a vectorial result. The latter is then generally processed by a vector-scalar unit VSU which transforms the vectorial type of result into a scalar type of result.

A situation of this kind is encountered, for example when said device is a neural processing device. Therein, the processors can exchange, for example neuron states $V_i$, synaptic coefficients $C_{ij}$ or contributions $C_{ij}.V_j$. A particularly interesting situation relates to the transposition of a synaptic coefficient matrix $C_{ij}$ into a transposed matrix $C_{ji}$. In that case the invention attractively utilizes a particular arrangement of synaptic coefficients in the local memories of elementary processors so that the transposed matrix $C_{ji}$ can be readily derived from the direct matrix $C_{ij}$. According to this arrangement, the data is no longer arranged in the form of rows (or columns) of a memory addressed by row-wise/column-wise addressing, but instead the synaptic coefficients are arranged along a diagonal of the memory. Thus, for example the column-wise addressing continues to address columns of the memory, but the row-wise addressing then addresses diagonals (or more exactly parallels to the diagonals) of the memory. Another choice enables reversal of the two types of addressing.

In order to recover the synaptic coefficients in the correct order in the case of a diagonal arrangement of the synaptic coefficients, it is necessary to permutate all synaptic coefficients. By allowing the elementary processors to exchange data between neighbours, the data processing device in accordance with the invention enables implementation and fast execution of this type of processing. Such a diagonal-wise arrangement is described, for example in U.S. Pat. No. 5,075,889 which is incorporated herein by way of reference.

The unit VSU can thus determine a scalar quantity which is equal to the sum of the contributions $C_{ij}.V_i$ delivered by each processor or to the sum of the contributions $C_{ji}.V_j$ in the case of transposed matrices. This facility is used in the so-called learning mode of a neural network during the implementation of the error-back propagation algorithm.

However, the communication means 15 are not restricted to permutation of synaptic coefficients and can also be used for other data in the case of neural networks or when the combination of elementary processors constitutes a different machine necessitating interaction between the data streams supplied by elementary processors. It may concern, for example a processing device which performs a digital filtering operation. A sequence of samples $x_1$–$x_n$, is distributed between the n elementary processors by serial loading via the concatenated path DP. The weighting coefficients of the filter are stored in the local memory of each processor. The elementary contributions determined in each elementary processor are combined in the unit VSU.

Figure 3:
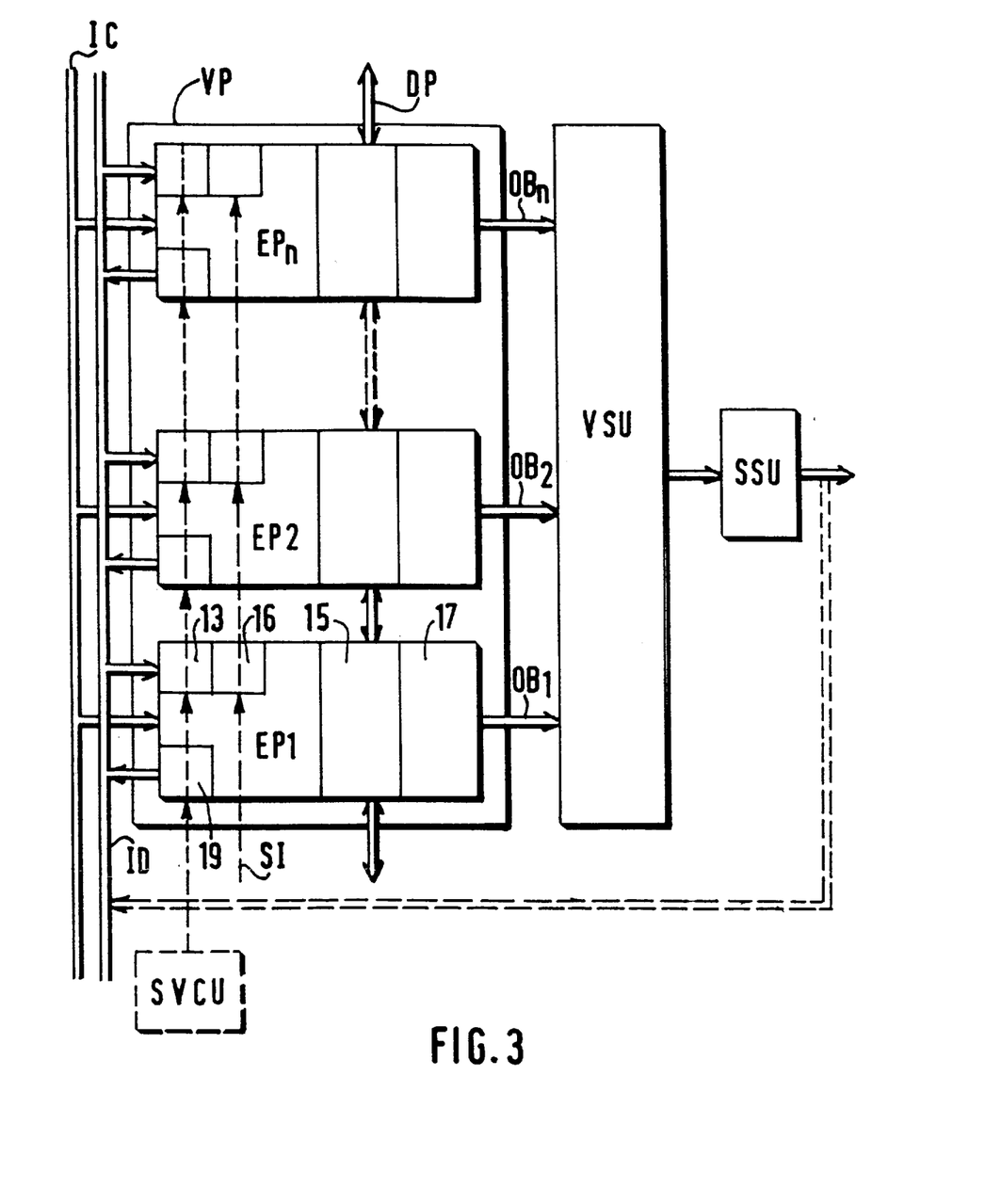
FIG. 3 shows a diagram of a further embodiment of a part of a data processing device in accordance with the invention.

FIG. 3 shows a specific embodiment of the invention. For given applications it may also be desirable that each elementary processor can communicate with other elementary processors via the common data bus ID. This is the case, for example when an elementary processor needs to communicate a data to all or given other elementary processors. A processor can calculate a local maximum (minimum) which is applied to the other processors in order to determine an overall maximum (or minimum). To this end, each elementary processor comprises output means 19 which place at least one scalar data on the input bus ID. Placement of the data on the bus is controlled by a control unit SVCU which activates only a single processor at a time. This command can act individually on each elementary processor as a result of an identifier stored in an identification circuit 16 provided in each elementary processor which receives an identification signal SI. Similarly, each elementary processor comprises input means 13 which enable, either selectively or collectively, the data placed on the input bus ID to be entered into the elementary processors. The input means 13 are then also controlled by the control unit SVCU and the identification signal SI. Thus, the same scalar data can be distributed among all elementary processors; this operation resembles a scalar-vector transformation. The unit SVCU then acts as a scalar-vector transformation unit.

The data thus placed on the bus ID can be supplied not only by the output means 19 but can also originate from another source. Specifically, the scalar result supplied by the unit VSU may be processed by a unit SSU which transforms the scalar result into another scalar result. The latter can then be fed back on the bus ID so as to be selectively or collectively distributed among the elementary processors. This feedback mode of operation is implemented in given processing phases of a neural network. For example, if the unit VSU supplies the scalar result $\Sigma C_{ij}.V_i$, this scalar result can be subjected to a non-linear function in the unit SSU in order to obtain the scalar result $V_j=f(\Sigma\ C_{ij}.V_i)$ which is subsequently collectively distributed among all elementary processors.

Figure 4:
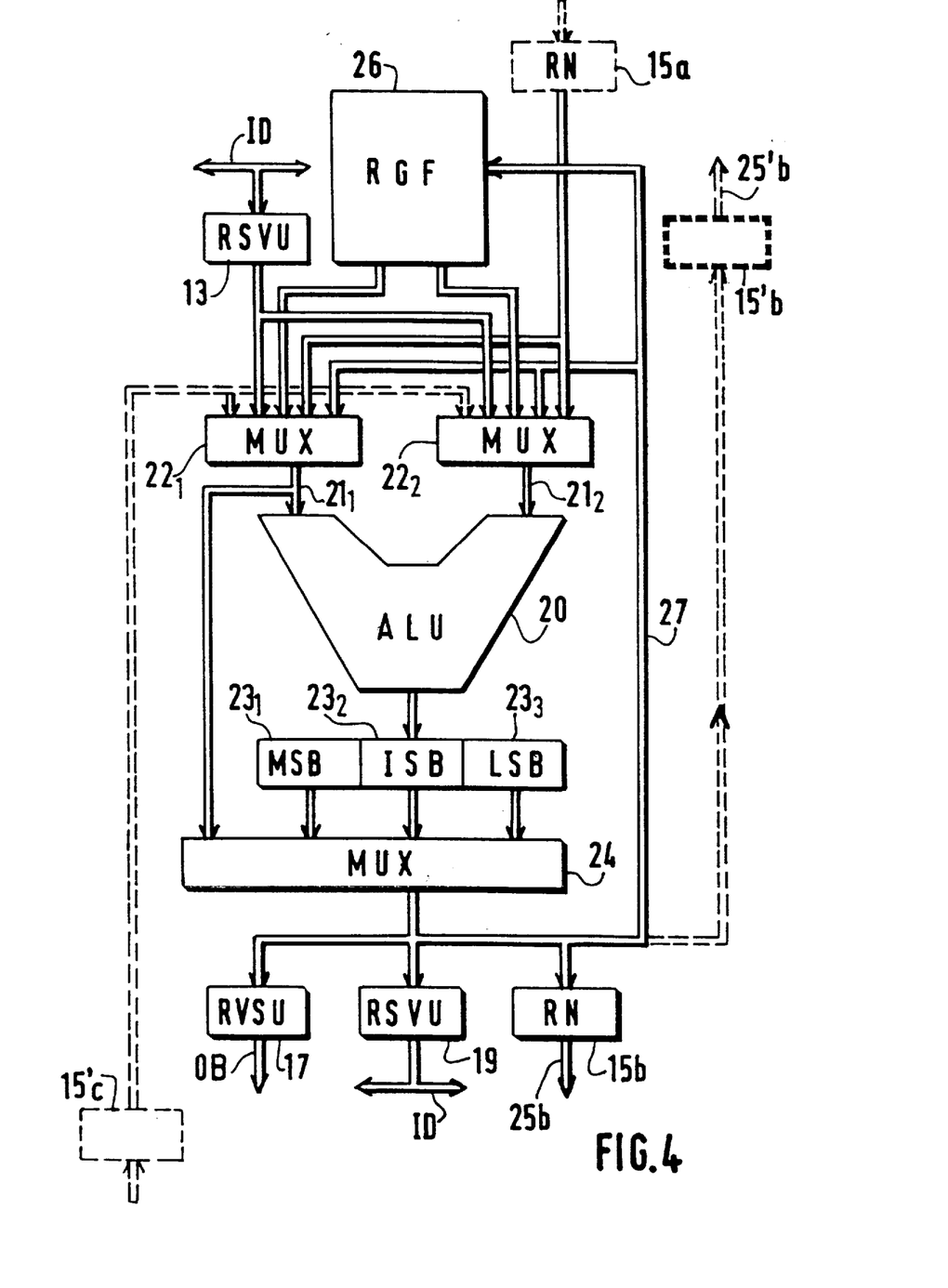
FIG. 4 shows a diagram of an elementary processor of said further embodiment.

FIG. 4 shows a diagram of an elementary processor provided with communication means 13, 15, 17 and 19. In a simplified version, the means 13 and 19 need not be present. The processor comprises an arithmetic and logic unit ALU 20, comprising two inputs $21_1$, $21_2$ which receive data from two multiplexers $22_1$, $22_2$, respectively. The output of the ALU supplies data distributed in three fields:

a field MSB which is formed by the most-significant bits, a field LSB which is formed by the least-significant bits, a field ISB which is formed by bits intermediate of the two above fields.

The fields MSB, ISB, LSB are loaded into registers $23_1$, $23_2$, $23_3$, respectively. These registers are connected to a multiplexer 24 which selects a field from the fields MSB, ISB, LSB. The selection can also be extended to four fields by adding the data field presented to the input to the input $21_1$ or $21_2$. This enables the latter data to pass from the input to the output of the processor without being treated by the ALU. The field selected by the multiplexer 24 can be loaded:

either into a register RVSU 17 whose data is applied to the unit VSU, or into a register RSVU 19 whose data is applied to the input bus ID under the control of the control unit SVCU, or into a register RN 15b whose data can be applied to an adjoining elementary processor.

In order to denote the association of the registers 15 in this part of the description, the index b is added to the elementary processor shown in FIG. 4 and the indices a and c are added to the registers which are adjacently arranged in the upstream and the downstream direction.

If the elementary processor is to communicate with one of its adjoining processors (bidirectional communication), the register 15 is doubled by a register 15'b. The output 25'b of the register 15'b is then connected to the register 15'a of the preceding elementary processor if the output 25b of the register 15b is connected to the next elementary processor. The output of the register 15'c of the next processor is then connected to the input of the multiplexers $22_1$, and $22_2$. The register 15'b is shown in heavy dashed lines in order to indicate that it is facultative, and the registers 15a and 15'c are shown in thin dashed lines in order to indicate that they relate to adjoining elementary processors.

The input multiplexers $22_1$, $22_2$ can receive data from different sources. They are connected:

to the means 13 comprising a register RSVU which receives data from the input bus ID, to a memory 26 which is organized as a stack of registers, to a register 15a which is included in the preceding elementary processor and which is analogous to the register 15b, to the output of the multiplexer 24, to the output of the register 15'c if this register is present.

In order to achieve an as high as possible read-out speed for the memory, the memory 26 is preferably a memory with dual access in the read mode. Two types of data which are to be available at the same time can thus be written into the memory via the two inputs of the ALU. One type of data may be formed, for example by neuron states; the other type of data may then be formed by synaptic coefficients.

As is possible for the implementation of given algorithms, the same neuron state is to be associated with several synaptic coefficients or vice versa; to this end, in the memory 26 mainly synaptic coefficients or mainly neuron states can be stored, or equal amounts thereof can be stored.

Depending on the learning or resolving phases implemented in a neural processing operation, the data processing device in its entirety and each elementary processor specifically has to update synaptic coefficients and neuron states. This updated data, supplied by the multiplexer 24, is written (connection 27) into the memory 26 in the course of the execution of the operations.

Figure 5:
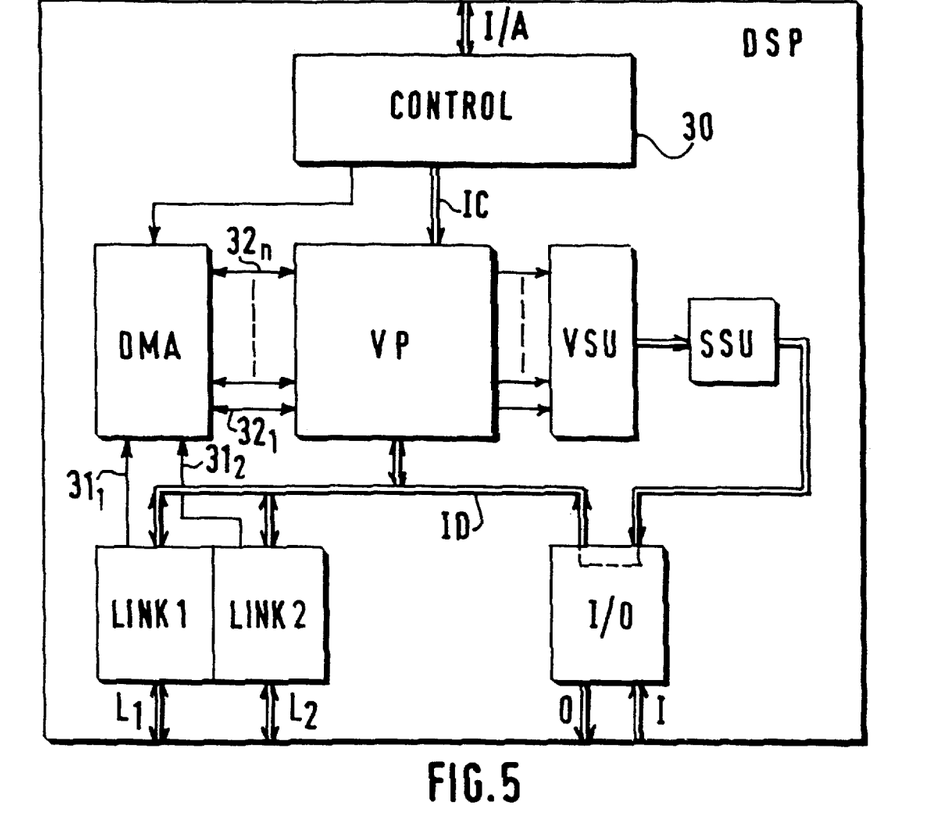
FIG. 5 shows a diagram of a data processing device in accordance with the invention.

FIG. 5 shows a simplified architecture of a data processing device (DSP). It comprises the vectorial processor VP, consisting of elements $EP_n$, the unit VSU and the unit SSU already described. For communication with the environment, the device DSP comprises:

an input/output interface I/O, a linking interface LINK1/LINK2, a bus I/A which receives or supplies instructions and/or addresses.

The interface I/O can:

apply data to the environment via the bus O, receive data from the environment via the bus I, transfer data from the unit SSU to the vectorial processor VP.

The linking interface preferably comprises two analogous blocks LINK1 and LINK2 which can communicate (L1 and L2) with the environment in the bidirectional mode.

These two blocks LINK1 and LINK2 communicate (connections $31_1$, $31_2$) with an internal direct memory access block DMA. The block DMA is controlled by a control unit 30. The block DMA comprises a counter which generates addresses $32_1$–$32_n$ for each local memory RGF of each elementary processor in order to extract from or place on the bus ID data travelling from the interior to the environment of the device DSP or vice versa.

The control block 30 applies the control signals to different units on the basis of instructions or addresses received via the bus I/A.

The data processing device DSP may be used in several ways without modifying either its concept or its architecture.

Figure 6:
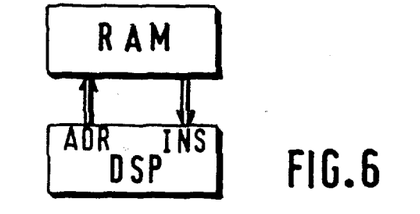
FIG. 6 shows a diagram for connection of a RAM to the data processing device.

FIG. 6 shows an autonomous mode of operation. The device DSP is connected to an external RAM. They communicate via the bus I/A, the device DSP receiving instructions INS from the RAM via a part of the bus I/A, for example 16 bits, and applying addresses ADR to the RAM in order to obtain subsequent instructions via the other part of the bus I/A, for example 16 bits.

Figure 7:
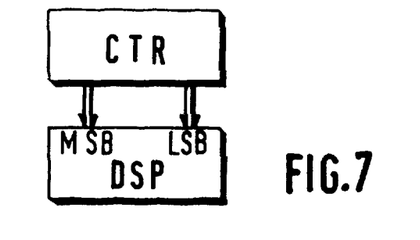
FIG. 7 shows a diagram for connection of an external controller to the data processing device.

FIG. 7 shows a mode of operation where the device DSP is connected to an external controller CTR. The bus I/A is then used completely (32 bits) for supplying the device DSP with instructions, the bus I/A being subdivided into bits of high significance MSB and bits of low significance LSB.

Figure 8:
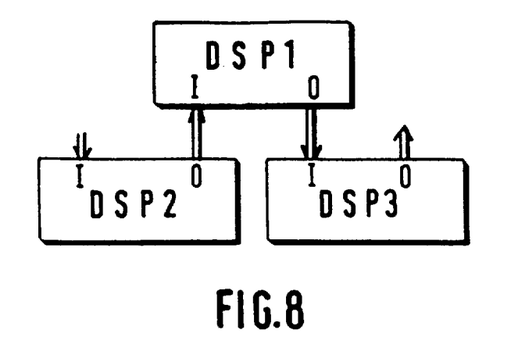
FIG. 8 shows a diagram for connection of a data processing device to several other data processing devices via input/output interfaces I/O.

It is also possible to interconnect several devices DSP via the interfaces I/O (FIG. 8). Thus, a device DSP1 can receive on the one hand, via its bus I (16 bits), data from the bus O (16 bits) of a device DSP2, and can on the other hand apply, via its bus O (16 bits) data to the bus I (16 bits) of a device DSP3.

Figure 9:
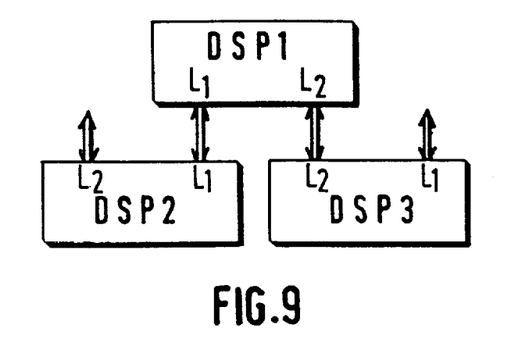
FIG. 9 shows a diagram for connection of a data processing device to several other data processing devices via linking interfaces L1/L2.

The interconnection can also be realised via linking interfaces LINK1/LINK2 (FIG. 9). A device DSP1 can thus on the one hand exchange data bidirectionally with a device DSP2 via their bus L1 and on the other hand exchange data bidirectionally with a device DSP3 via their bus L2.

Figure 10:
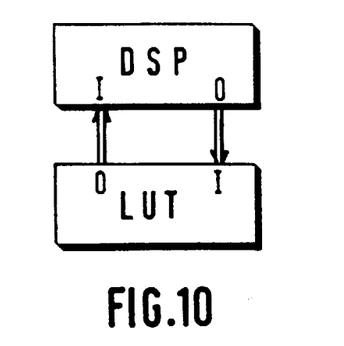
FIG. 10 shows a diagram for connection of a data processing device to a data look-up table LUT via the input/output interfaces I/O.

A device DSP may also be connected (FIG. 10) to an external scalar processor or to a data look-up table LUT, the bus I of one device being connected to the bus O of the other device.

Figure 11:
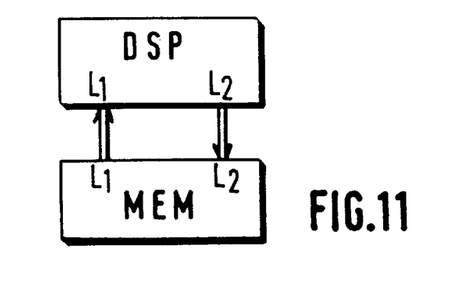
FIG. 11 shows a diagram for connection of a data processing device to a back-up RAM via the linking interfaces L1/L2.

It is also possible to connect a device DSP to a back-up memory MEM (FIG. 11). The interconnected buses L1 establish one direction of communication and the interconnected buses L2 establish the other direction of communication.

All configurations show the extent of the functional capacities which can be realised by means of the data processing device in accordance with the invention.

I claim:

1. A data processing semiconductor device (VP), comprising:
    a plurality of elementary processors (EP) which operate in a common instruction mode acting on multiple data, using a plurality of output data buses (OB), said elementary processor comprising means enabling an arbitrary elementary processor to exchange data with at least one adjoining elementary processor via at least one linked data path;
    a common input control bus (IC);
    a common input data bus (ID); and
    a vector to scalar transformation unit connected to the elementary processors for aggregating output data from the processors into a scalar value.

2. A device as claimed in claim 1, characterized in that each elementary processor comprises input means (13) and/or output means (19) and an identification member (16) which activates said means (13) (19) when an identification signal (SI) is received by said processor, said device also comprising a scalar-vector control unit (SVCU) which, in response to said identification signal, authorizes said elementary processor either to receive or to supply a scalar data.

3. A device as claimed in claim 2, characterized in that several elementary processors may be authorized so as to receive at least one common scalar data.

4. A device as claimed in claim 3, in which the means (VSU) supply a scalar result, characterized in that said common scalar input data is supplied by a scalar-scalar transformation unit (SSU) which receives said scalar result from the vector-scalar transformation unit (VSU).

5. A device as claimed in any one of the claim 1, characterized in that each elementary processor comprises a local memory with a dual-access read mode.

6. A device as claimed in claim 5, characterized in that the local memory is organized as a stack of registers and comprises means for storing synaptic coefficients and neuron states, and stores either mainly synaptic coefficients or mainly neuron states.

7. A device as claimed in claim 6, characterized in that the synaptic coefficients are stored in the local memory in an arrangement which is referred to as a diagonal arrangement.

8. A device as claimed in claim 1, comprising a linking block (LINK 1) having a bidirectional bus to dispatch/receive data to/from at least one similar device (DSP1, DSP2, DSP3) and/or to an external member (MEM) arranged in a star configuration.

9. A device as claimed in claim 1, comprising an interface block (I/O) having one monodirectional input bus and one monodirectional output bus enabling the device to be cascaded with several devices (DSP1, DSP2, DSP3) and/or connection of the device to an external member (LUT) arranged in a chain configuration.

10. A processor comprising:
    a plurality of elementary processors operating in common instruction mode;
    link means for pairwise communication between adjacent ones of the processors, the link means forming a concatenated data path through the processors;
    a common input control bus for providing common instructions to the processors;
    a common input data bus for providing data to the processors, distinct from the control bus;
    a plurality of respective output data buses, distinct from the control and input data buses, each output data bus being for providing output data from a respective one of the processors;
    a vector to scalar unit for combining the output data from the output data buses.

11. The processor of claim 10 adapted to realize a neural network wherein each of the elementary processors is adapted to apply respective synaptic coefficient data to respective input data.

12. The processor of claim 10 wherein the vector to scalar unit is adapted to add the output data.

13. The processor of claim 10 adapted to realize a neural network wherein
    each elementary processor is adapted to apply respective synaptic coefficient data to respective input data and to store result data;
    the link means are adapted to communicate one or more of neural states $V_i$, synaptic coefficient data $C_{ij}$, or contributions $C_{ij}.V_j$.

14. The processor of claim 13 wherein
    the respective coefficient data is stored in a coefficient matrix in such a way as to be diagonally addressable; and
    the processors are arranged to provide a transposed coefficient matrix.

15. The processor of claim 10 adapted to realize a digital filtering operation
    wherein each elementary processor is adapted to store respective weighting coefficients;
    the concatenated data path is adapted to load, serially to the elementary processors, a sequence of samples $x_1$–$x_n$; and
    the vector to scalar unit provides combined output signal data.

16. The processor of claim 10
    wherein the elementary processors are adapted to supply respective pieces of output data to the common input bus;
    a scalar to vector control unit for activating only a single one of the elementary processors at a time, so that that single one of the elementary processors receives one of the respective pieces of output data supplied by another one of the elementary processors.

17. The processor of claim 10
wherein an output of the vector to scalar unit is coupled to feedback data to the common data bus; and the processor further comprises a scalar to vector control unit for activating at least one of the elementary processors to process such supplied data.

18. A digital data processing device comprising:

a plurality of elementary processors operating in common instruction mode;

a common input bus for supplying data to the processors;

a plurality of respective output buses, distinct from the input bus for communicating output data from the processors;

link means for pairwise communication between adjacent ones of the processors, the link means forming a concatenated data path through the processors;

control means for causing the link means to systematically communicate data between the processors during a common processing task, so that at least one processor operates in dependence on operation of at least one other processor.

\* \* \* \* \*